(12) United States Patent
Al Faihan

(10) Patent No.: US 10,545,037 B2
(45) Date of Patent: Jan. 28, 2020

(54) FLOW LINE INSERT WITH INDENTATIONS

(71) Applicant: Saudi Arabian Oil Company, Dhahran (SA)

(72) Inventor: Lahdan Fahad Al Faihan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 147 days.

(21) Appl. No.: 15/659,151

(22) Filed: Jul. 25, 2017

(65) Prior Publication Data

US 2018/0031397 A1 Feb. 1, 2018

Related U.S. Application Data

(60) Provisional application No. 62/369,689, filed on Aug. 1, 2016.

(51) Int. Cl.
*G01D 11/24* (2006.01)
*G01K 1/08* (2006.01)
*G01K 13/02* (2006.01)
*F15D 1/00* (2006.01)

(52) U.S. Cl.
CPC .......... *G01D 11/245* (2013.01); *F15D 1/005* (2013.01); *G01K 1/08* (2013.01); *G01K 13/02* (2013.01); *G01K 2013/026* (2013.01)

(58) Field of Classification Search
CPC ........ G01D 11/245; F15D 1/005; G01K 1/08; G01K 13/02; G01K 2013/026
See application file for complete search history.

(56) References Cited

U.S. PATENT DOCUMENTS

| | | | |
|---|---|---|---|
| 2,494,628 A | 1/1950 | Oberding | |
| 3,248,886 A | 5/1966 | Blenkarn | |
| 6,695,540 B1 | 2/2004 | Taquino | |
| 6,702,026 B2 | 3/2004 | Allen et al. | |
| 6,948,884 B2 | 9/2005 | Xu et al. | |
| 6,957,586 B2 | 10/2005 | Sprague | |
| 7,836,780 B2 | 11/2010 | Garnett et al. | |
| 8,424,396 B2 | 4/2013 | Knight | |
| 8,926,176 B2 | 1/2015 | Middleton et al. | |
| 2008/0302537 A1 | 12/2008 | McMiles | |
| 2008/0307901 A1* | 12/2008 | Knight | G01N 1/2247 73/863.11 |
| 2009/0211368 A1* | 8/2009 | Garnett | G01F 1/46 73/861.22 |

(Continued)

FOREIGN PATENT DOCUMENTS

| | | | |
|---|---|---|---|
| DE | 102010030076 | 12/2011 | |
| DE | 102010030076 A1 * | 12/2011 | ............... G01K 1/16 |

(Continued)

OTHER PUBLICATIONS

Translation of DE 10 2010 030 076 A1, Brueck et al. (Year: 2011).*

(Continued)

*Primary Examiner* — Nathaniel T Woodward
(74) *Attorney, Agent, or Firm* — Fish & Richardson P.C.

(57) ABSTRACT

An example implementation of the subject matter described within this disclosure is a thermowell with the following features. A body has a closed end, an open end, an outer surface, and defining an interior cavity starting prior to the closed end and terminating at the open end. The outer surface defines dimples that reduce vibration in response to vortex shedding.

14 Claims, 3 Drawing Sheets

(56) References Cited

U.S. PATENT DOCUMENTS

| | | | | |
|---|---|---|---|---|
| 2013/0142216 A1* | 6/2013 | Kleven | .................... | G01K 1/08 374/208 |
| 2013/0283928 A1* | 10/2013 | Wiklund | .................. | G01K 1/08 73/861.18 |

FOREIGN PATENT DOCUMENTS

| | | | | |
|---|---|---|---|---|
| EP | 1006260 B1 | | 4/2004 | |
| EP | 3184980 A1 | * | 6/2017 | ............... G01K 1/08 |
| WO | 2011157467 | | 12/2011 | |

OTHER PUBLICATIONS

Altamira Instruments, Inc. Spares, Parts, and Supplies Order Form, Rev. Mar. 15, 2013, 4 pages.

Orbital Global Solutions, VE Thermowell Brochure, VE Technology, Elimnate Uncertainty in Natural Gas Sampling; www.orbitalglobalsolutions.com; 5 pages.

Bauscheke et al., Thermowell Calculations; Emerson Process Management, Mar. 2014, White Paper 00840-0200-2654, Rev AC, 22 pages.

Thermowells; Thermowell in ScrutonWell design, WIKA data sheet SP05.16, WIKA Alexander Wiegand SE & Co.,KG, Klingenberg/Germany, 5 pages.

International Search Report and Written Opinion issued in International Application No. PCT/US2017/044919 dated Oct. 9, 2017; 13 pages.

Gulf Cooperation Council Examination Report issued in GCC Application No. GC 2017-33782 dated Apr. 25, 2019, 5 pages.

Gulf Cooperation Council Examination Report issued in GCC Application No. GC2017-33782 dated Sep. 30, 2019, 3 pages.

* cited by examiner

FLOW LINE INSERT WITH INDENTATIONS

TECHNICAL FIELD

This disclosure relates to inserts in flow lines.

BACKGROUND

Tools can be inserted into process fluid flowing through the flow lines such as thermowells, injection quills, and sensor probes. A thermowell has a body with a closed end that is inserted into the process fluid and an open end, and the body defines an interior cavity (e.g., cylindrical cavity) that starts prior to the closed end and terminates at the open end. A temperature sensor can be inserted into the interior cavity to measure the temperature of the process fluid flowing through the flow line. An injection quill is a hollow cylinder with two open ends that allows a second fluid to be injected into the process fluid stream. A sensor probe is a cylindrical probe that is placed into a process stream. The sensor probe may be configured to measure temperature, flow, or another process parameter.

SUMMARY

This disclosure describes flow line inserts with indentations.

An example implementation of the subject matter described within this disclosure is a thermowell with the following features. A body has a closed end, an open end, an outer surface, and defining an interior cavity starting prior to the closed end and terminating at the open end. The outer surface defines dimples that reduce vibration in response to vortex shedding.

Aspects of the example implementation, which can be combined with the example implementation alone or in combination, include the following. The body of the thermowell can be cylindrical.

Aspects of the example implementation, which can be combined with the example implementation alone or in combination, include the following. The body can have a length spanning from the closed end to the open end and longer than a width of the body.

Aspects of the example implementation, which can be combined with the example implementation alone or in combination, include the following. Each of the dimples can be circular.

Aspects of the example implementation, which can be combined with the example implementation alone or in combination, include the following. Each of the dimples can include a same diameter and depth.

Aspects of the example implementation, which can be combined with the example implementation alone or in combination, include the following. The dimples can be evenly distributed on the outer surface.

Aspects of the example implementation, which can be combined with the example implementation alone or in combination, include the following. Each of the dimples can include a depth less than one quarter of a width between the interior cavity and the outer surface. Each of the plurality of dimples can have a diameter in a range of two to four times the depth of that dimple.

An example implementation of the subject matter described within this disclosure is a method with the following features. A thermowell is selectively positioned in a process fluid flow stream within a process fluid carrying flow line flowing a process fluid flow stream. The thermowell can include a body with a closed end, an open end, and an outer surface, and defining an interior cavity starting prior to the closed end and terminating at the open end. The outer surface defines dimples that reduce vibration in response to vortex shedding. Drag on the cylinder is affected in response to the process fluid flow stream flowing past the outer surface of the cylinder.

Aspects of the example method, which can be combined with the example method alone or in combination, include the following. A longitudinal axis of the thermowell can be oriented perpendicular to a flow direction of the process fluid flow stream.

Aspects of the example method, which can be combined with the example method alone or in combination, include the following. The dimples can have circular cross sections.

Aspects of the example method, which can be combined with the example method alone or in combination, include the following. Each of the dimples can include a same depth and a same diameter.

Aspects of the example method, which can be combined with the example method alone or in combination, include the following. The dimples can be evenly distributed on the outer surface.

Aspects of the example method, which can be combined with the example method alone or in combination, include the following. Each of the dimples can include a depth less than one quarter of a width between the interior cavity and the outer surface. Each of the dimples can have a diameter in a range of two to four times the depth of that dimple.

Aspects of the example method, which can be combined with the example method alone or in combination, include the following. The first end can be outside the process fluid carrying flow line and the second end can be inside the process fluid carrying flow line. The process fluid carrying flow line has an inside diameter. A position of the second end inside the process fluid carrying flow line can be at least one-third the inside diameter of the process fluid carrying flow line.

A second example implementation of the subject matter described within this disclosure is a thermowell with the following features. A cylinder is configured to at least partially be positioned in a process fluid flow stream within a process fluid carrying flow line. The cylinder includes a first end positioned outside the flow line, and a second end opposite the first end. The second end is positioned inside the flow line. A portion of the cylinder is inside the flow line contacting the process fluid flow stream. A portion of the outer surface within the flow line includes indentations distributed on the portion. The process fluid flow stream contacts the indentations. A vibration on the cylinder, in response to the process fluid flow stream, is affected by the plurality of indentations.

Aspects of the second example implementation, which can be combined with the second example implementation alone or in combination, include the following. A longitudinal axis of the thermowell can be oriented perpendicular to a flow direction of the process fluid flow stream.

Aspects of the second example implementation, which can be combined with the second example implementation alone or in combination, include the following. The indentations can include circular cross sections.

Aspects of the second example implementation, which can be combined with the second example implementation alone or in combination, include the following. Each of the indentations can include a same depth and a same diameter.

Aspects of the second example implementation, which can be combined with the second example implementation alone or in combination, include the following. The indentations can be evenly distributed on the outer surface.

Aspects of the second example implementation, which can be combined with the second example implementation alone or in combination, include the following. Each of the indentations can include a depth less than one quarter of a width between the interior cavity and the outer surface. Each of the plurality of indentations has a diameter in a range of two to four times the depth of that dimple.

The details of one or more implementations of the subject matter are set forth in the accompanying drawings and the description below. Other features, objects, and advantages of the subject matter will be apparent from the description and drawings, and from the claims.

DESCRIPTION OF DRAWINGS

Like reference symbols in the various drawings indicate like elements.

DETAILED DESCRIPTION

As process fluid in a pipe or flow line passes a thermowell or other objects inserted in the line, the insert is subject to static forces and resonance stresses. For example, vortexes can form off the insert (within the fluid) causing vibration and resonance of the insert. The induced vibration in turn can cause stresses and strains within the inserts. The induced vibrations can be critical when their frequency corresponds to the resonance frequency, natural frequency, and wake frequency of the insert. In response to vortex shedding, the insert can vibrate and oscillate. This stress can result in mechanical failures, which can lead to loss of fluid containment and equipment damage downstream of the insert.

To overcome and reduce the effect of the resonance frequency, inserts are frequently designed with shorter insertion lengths or thicker walls. However, in some cases, these modifications may not be enough to resolve the resonance frequency effect or reduce the ability to accurately measure the temperature or other parameters.

When an insert (for example, a hollow cylinder or a solid cylinder), such as a thermowell, is positioned in a process fluid flow stream, moment forces and vibration caused by the fluid flow can cause fatigue fractures and mechanical failure. To mitigate fatigue caused by the fluid flow, the insert can have an outer surface including dimples configured to reducing vortex-induced vibrations. For example, the dimples can be indentations that curve inward toward a longitudinal axis of the insert. The dimples can be distributed along the insertion length. The depth and diameter of the dimples may be varied based on the process parameters. In some implementations, the dimples can reduce the effect of the resonance frequency and moment forces on the insert.

In some implementations, the dimpled insert is a thermowell that includes dimples on an outer surface as described in the following sections. In a dimpled thermowell, a sensor can be positioned in an inner cavity, and the dimpled thermowell can be placed in a fluid flow. In certain implementations, the dimpled insert can also be implemented as a dimpled injection quill or any other dimpled insert (hollow or solid cylinder) without departing from the scope of the disclosure. For example, a dimpled thermowell, a dimpled injection quill, a dimpled sensor probe, or other dimpled inserts can be inserted into and installed in a flow line. An injection quill is a hollow cylinder with two open ends that is configured to inject another fluid into a process fluid stream. A sensor probe is a cylindrical probe that is placed into a process stream. The sensor probe may be configured to measure temperature, flow, or another process parameter. In a dimpled sensor probe, the dimpled cylindrical outer body of the probe measures the process parameter.

Figure 1:
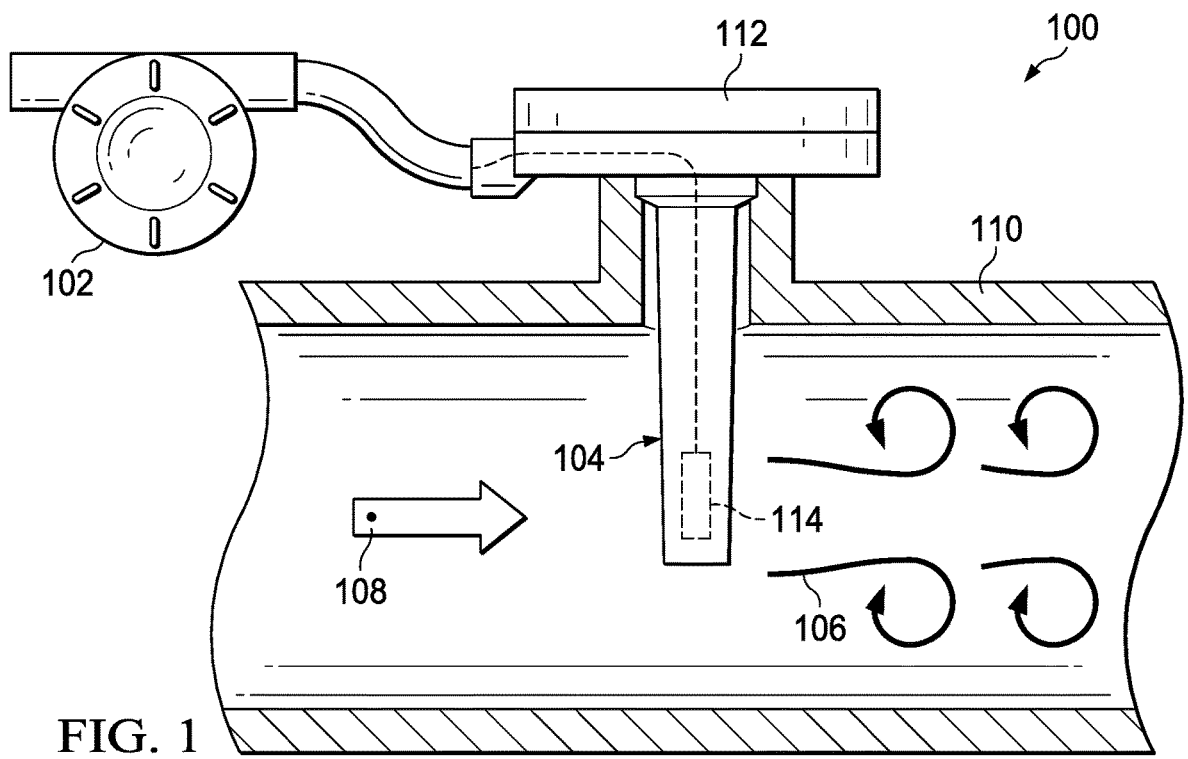
FIG. 1 shows a schematic of an example instrumentation system installed in a flow line.

FIG. 1 shows a schematic of an example instrumentation system 100. A process fluid 108 flows through a process flow line 110, for example, hydrocarbons or water. A dimpled insert (for example, a dimpled thermowell 104) is inserted into the process flow line 110 such that at least a portion of the outer surface of the dimpled thermowell 104 resides in and contacts the process fluid 108. The thermowell 104 is inserted into the flow line 110 via an external connection 112. The external connection 112 can be a flange, threaded connection, nipple, or any other connection. The thermowell 104 protects an instrument 114 from the process fluid 108, and is configured to allow the instrument 114 to detect fluid properties through the wall of the thermowell 104. The instrument 114 is connected to a transmitter 102 that receives the sensed fluid properties from the instrument 114 and displays or sends (or both) the signal from the instrument 114 to a different location.

In some implementations, the thermowell 104 includes an outer surface that defines or otherwise includes dimples. For example, the dimples can have circular cross sections or other cross-sectional shapes without departing from the scope of the disclosure. In regards to circular cross sections, the dimples can include a portion that is a spherical cap. In those instances, each dimple can have the same radius and depth. However, one or more dimples can have different radius or depth without departing from the scope of the disclosure. The depth of the dimple is a function of the wall thickness which is the distance between the bore inner wall and the outer wall of the thermowell. The depth is not greater than quarter of the wall thickness length. The diameter of dimple is also a function of the depth of the dimple. The diameter is between two times the depth length and should not be more than four times the depth length. The dimples can be distributed in a regular pattern such as evenly distributed. A subset or all of the dimples may be distributed in an irregular pattern without departing from the scope of the disclosure. For example, some thermowells have different wall thicknesses of that varies along the insertion length (the length from flange connection to tip of the thermowell). Since the wall thickness between the bore and the outer wall of the thermowell is variable, this can result dimples with different distribution, size, and depth. To reduce vortex-induced vibration, the dimples can have different radius, depths, and patterns based on operating conditions. The passing fluid velocity, which affects the drag force around the thermowell, is the dominant design parameter when designing the diameter or the depth of the dimple. As the depth and radius of the dimple are decreased, the drag force decreases linearly.

In some implementations, the thermowell 104 can be made of metal or other temperature conducting material. In general, the dimpled cylinder inserted into the process fluid flow line 110 can be made of a material that can withstand the effects of the process fluid flowing through the flow line 110 and that can aid in the purpose of inserting the dimpled cylinder into the flow line. As an alternative or in addition to metal, the material can be a ceramic, polymer, composite material, or any combination of materials in certain implementations, for example, implementations in which the cylinder is an injection quill or sensor probe.

The flow of the process fluid 108 flowing around the dimpled thermowell 104 creates turbulence 106 that can induce vibration in the thermowell 104. The turbulence flowing around dimpled thermowell 104 can reduce vortex-induced vibration as compared to thermowells 104 without dimples.

Figure 2:
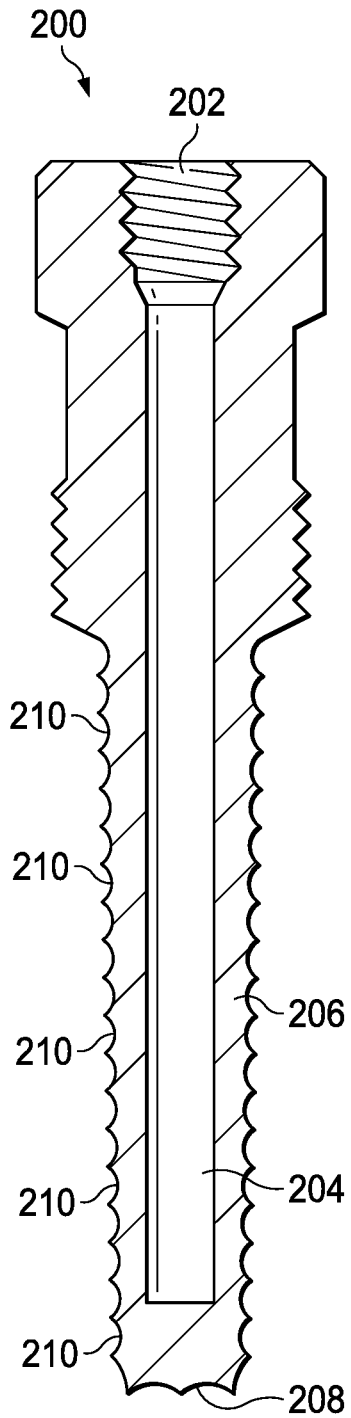
FIG. 2 shows an example cross-section of a dimpled thermowell.

FIG. 2 shows an example cross-section of the dimpled thermowell 200. The dimpled thermowell 200 includes a first end 202 and a second end 208 opposite the first end 202. The first end 202 is left open for the insertion of an instrument 114, such as a thermocouple. The second end 208 is closed to prevent fluid ingress and is the end inserted into the process fluid stream 108. The thermowell 104 also has an inner surface 204 that defines an inner cavity and an outer surface 206 between the first end 202 and the second end 208. The outer surface 206 is covered with dimples 210. That is, the dimples 210 are formed in the wall between the outer surface 206 and the inner surface 204. The longitudinal axis of thermowell 104 is often perpendicular to the flow line 110 and the process fluid flow stream 108. In some implementations, the orientation of the thermowell 104 can be different from perpendicular to the flow line 110 without departing from the scope of the disclosure. For example, an angle between the thermowell 104 and the flow line 110 can range between substantially 45° and 90°.

In some implementations, the dimples 210 are indentations that can have circular cross sections and can be distributed along the outer surface 206. The width, depth, and pattern of the dimples 210 are configured based on the properties of the process fluid 108. The dimples 210 are configured to reduce the vibration of an immersed cylinder, such as dimpled thermowell 200. In some implementations, the depth of the dimples is not greater than one quarter of the wall thickness, wall thickness defined as the material between the inner surface 204 and the outer surface 206. The diameter of the dimples 210 is between twice the depth length and four times the depth length. As the wall thickness of a thermowell can be variable, the size and distribution of the dimples 210 may be variable across the outer surface 206. The dimples 210 can be added to the cylinder via machining techniques, 3D printing, forging, casting, or any other manufacturing process known to the art.

Figure 3:
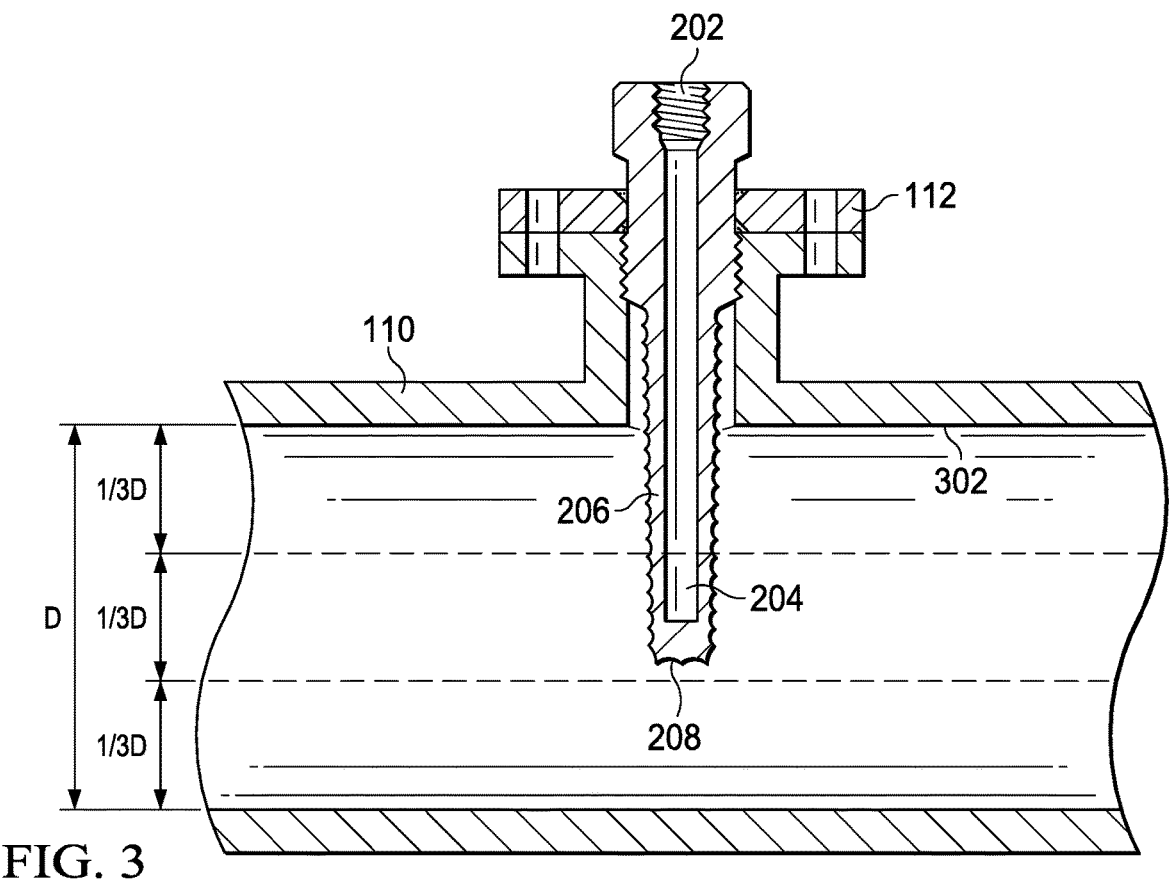
FIG. 3 shows an example of a thermowell positioned inside a flow line.

FIG. 3 shows an example schematic of either thermowell 104 or dimpled thermowell 200 positioned in a flow line 110. The location of the second end 208 of thermowell 104 can be at least one-third the inner diameter (D) of flow line 110 from the inner wall 302 of the line 110. In other words, the length of the portion of the thermowell 104 within the flow line 110 is between approximately one-third and two-thirds the inside diameter (D) of the flow line 110 (commonly known as the "middle third"). The position of the second end 208 can be selected such that any instruments 114 within the thermowell 104 are detecting the properties at the center of the process fluid flow path. The position of the second end of the dimpled cylinder can similarly be selected for other implementations of the cylinder, such as injection quills or sensor probes, as well.

Figure 4:
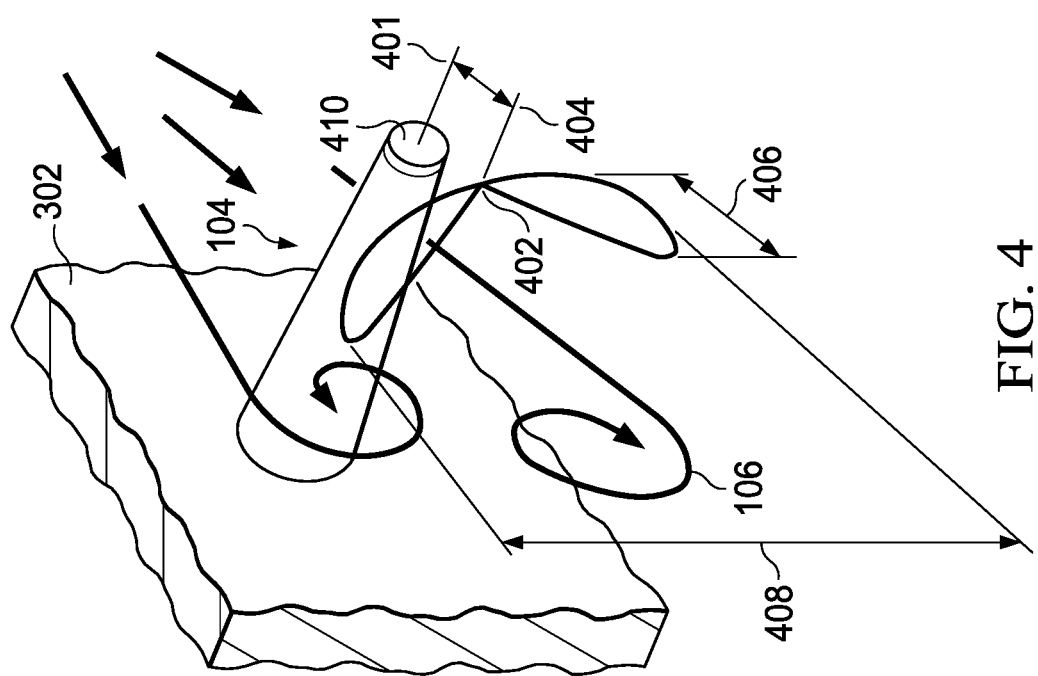
FIG. 4 shows a schematic detailing the vibration and flow profile of a thermowell in a fluid stream.

FIG. 4 shows a schematic diagram detailing the vibration and flow profile of a smooth cylinder, such as thermowell 104 immersed in fluid stream 108. Thermowell 104 is shown as a cantilevered cylinder against the inner wall 302. When process fluid 108 is flowing through the flow line 110 and past the thermowell 104, an immersed end 410 is displaced from a second end starting position 401 to a second end displacement position 404. The second end displacement position 404 is a position of the immersed end 410 of thermowell 104 when the flow is fast enough to cause a displacement of the immersed end 410. The second end starting position 401 is the position where the immersed end 410 is located when no flow is passing through the flow line 110. The turbulence 106 induces an oscillation 402 in the immersed end 410. The oscillation 402 is centered around the second end displacement position 404 and moves in a figure-8 pattern in a direction parallel to the flow 406 and a direction perpendicular to the flow 408. The amplitude and frequency in both the parallel direction 406 and the perpendicular direction 408 is reduced with the addition of dimples 210 on thermowell 104.

Figure 5:
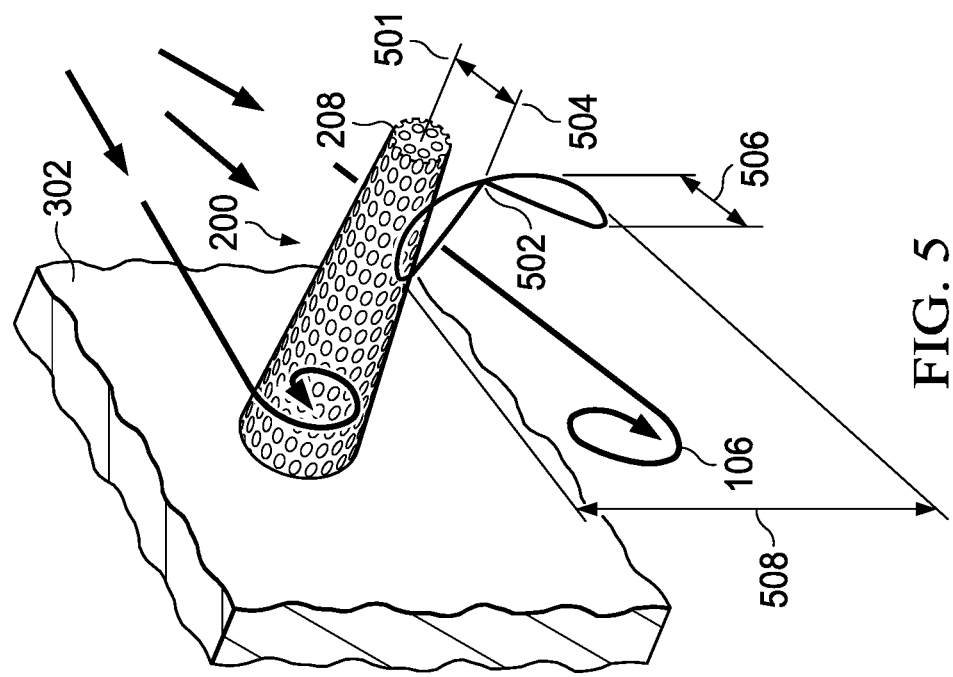
FIG. 5 shows an example flowchart for a method to use a dimpled cylinder in a fluid stream.

FIG. 5 shows a schematic diagram detailing the vibration and flow profile of a dimpled cylinder, such as thermowell 200, immersed in fluid stream 108. The amplitude of oscillation 502 is less than oscillation 402 in both the parallel direction 506 and the perpendicular direction 508. The displacement between second end starting position 501 and second end displacement position 504 is less than the displacement between second end starting position 401 to a second end displacement position 404 as well.

Figure 6:
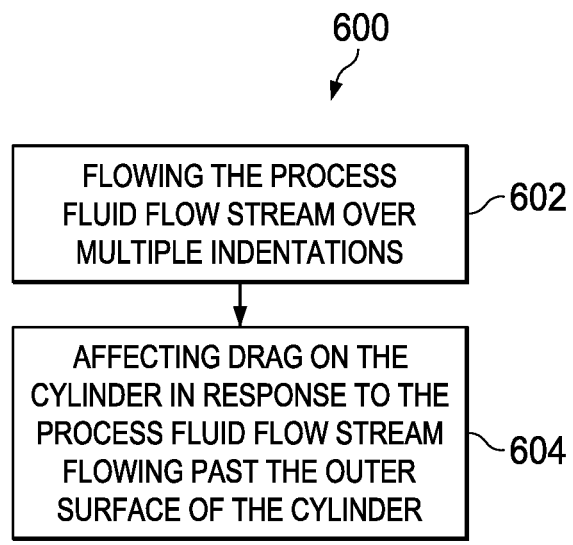
FIG. 6 is a shows an example flowchart for utilizing a cylinder with a dimpled surface.

FIG. 6 is a flowchart of an example process 600 for utilizing a cylinder with a dimpled surface, such as the dimpled thermowell 200. At 602, a process fluid 108 is flowed over multiple indentations. At 604, the drag on the cylinder is affected in response to the process fluid 108 flow stream flowing past the outer surface of the cylinder.

A number of implementations of the subject matter have been described. Nevertheless, it will be understood that various modifications may be made without departing from the spirit and scope of the subject matter. For example, dimples can be added to an injection quill or sensor probe with similar results. Accordingly, other implementations are within the scope of the following claims.

What is claimed is:

1. A thermowell, comprising:
   a body having a closed end, an open end, and an outer surface, and defining an interior cavity starting prior to the closed end and terminating at the open end, wherein the outer surface defines a plurality of dimples configured to reduce vibration in response to vortex shedding, wherein each of the plurality of dimples defines a spherical cap, wherein the plurality of dimples is evenly distributed on the entire outer surface exposed to a process fluid.

2. The thermowell of claim 1, wherein the body is cylindrical.

3. The thermowell of claim 1, wherein the body has a length spanning from the closed end to the open end and larger than a width of the body.

4. The thermowell of claim 1, wherein each of the plurality of dimples comprises a same diameter and depth.

5. The thermowell of claim 1, wherein each of the plurality of dimples comprises a depth less than one quarter of a width between the interior cavity and the outer surface, and each of the plurality of dimples has a diameter in a range of two to four times the depth of that dimple.

6. A method comprising:
   in a process fluid carrying flow line flowing a process fluid flow stream, selectively positioning a thermowell in the process fluid flow stream, the thermowell comprising:
   a body having a closed end, an open end, and an outer surface, and defining an interior cavity starting prior to the closed end and terminating at the open end, wherein the outer surface defines a plurality of dimples configured to reduce vibration in response to vortex shedding, wherein each of the plurality of dimples defines a spherical cap, wherein the plurality of dimples is evenly distributed on the entire outer surface exposed to the process fluid flow stream; and
   affecting drag on the body in response to the process fluid flow stream flowing past the outer surface of the body.

7. The method of claim 6, wherein a longitudinal axis of the thermowell is oriented perpendicular to a flow direction of the process fluid flow stream.

8. The method of claim 6, wherein each of the plurality of dimples comprises a same depth and a same diameter.

9. The method of claim 6, wherein each of the plurality of dimples comprises a depth less than one quarter of a width between the interior cavity and the outer surface, and each of the plurality of dimples has a diameter in a range of two to four times the depth of that dimple.

10. The method of claim 6, wherein the open end is outside the process fluid carrying flow line, wherein the closed end is inside the process fluid carrying flow line, wherein the process fluid carrying flow line has an inside diameter, wherein a position of the closed end inside the process fluid carrying flow line is at least one-third the inside diameter of the process fluid carrying flow line.

11. A thermowell, comprising:
    a cylinder configured to at least partially be positioned in a process fluid flow stream in a process fluid carrying flow line, the cylinder comprising:
    a first end positioned outside the flow line,
    a second end opposite the first end, the second end positioned inside the flow line, a portion of the cylinder inside the flow line contacting the process fluid flow stream, and
    an outer surface of the cylinder between the first end and the second end, a portion of the outer surface inside the flow line comprising a plurality of indentations distributed on the portion, wherein each of the plurality of indentations defines a spherical cap shape, wherein the plurality of indentations is evenly distributed on the entire outer surface exposed to the process fluid flow stream, wherein the process fluid flow stream contacts the plurality of indentations, wherein a vibration on the cylinder in response to the process fluid flow stream is affected by the plurality of indentations.

12. The thermowell of claim 11, wherein a longitudinal axis of the thermowell is oriented perpendicular to a flow direction of the process fluid flow stream.

13. The thermowell of claim 11, wherein each of the plurality of indentations comprises a same depth and a same diameter.

14. The thermowell of claim 11, wherein each of the plurality of indentations comprises a depth less than one quarter of a width between an interior cavity and the outer surface, and each of the plurality of indentations has a diameter in a range of two to four times the depth of that indentation.

* * * * *